US005773787A

United States Patent [19]

Turchi

[11] Patent Number: 5,773,787

[45] Date of Patent: Jun. 30, 1998

[54] PLASMA-GUN VOLTAGE GENERATOR

[75] Inventor: Peter J. Turchi, Worthington, Ohio

[73] Assignee: The United States of America as represented by the Secretary of the Air Force, Washington, D.C.

[21] Appl. No.: 704,044

[22] Filed: Aug. 28, 1996

[51] Int. Cl.[6] ..................................................... B23K 10/00

[52] U.S. Cl. ................................ 219/121.48; 219/121.54; 219/121.59; 219/123; 315/111.31

[58] Field of Search ......................... 219/121.48, 121.54, 219/123, 121.59, 121.52; 315/111.31–111.81

[56] References Cited

U.S. PATENT DOCUMENTS

| | | | |
|---|---|---|---|
| 3,435,287 | 3/1969 | Jacobson | 315/110 |
| 3,594,609 | 7/1971 | Vas | 315/111.31 |
| 3,714,510 | 1/1973 | Hofmann | 317/11 A |
| 4,019,006 | 4/1977 | Strossner | 200/114 R |
| 4,360,763 | 11/1982 | Gryzinski | 315/111.01 |

*Primary Examiner*—Mark H. Paschall
*Attorney, Agent, or Firm*—William G. Auton

[57] ABSTRACT

The Plasma-Gun Voltage-Generator (PVG) uses a pulsed plasma-flow to displace magnetic flux, thereby inducing high voltages across multi-turn coils. Typical operating parameters are voltages of 0.5 to 1 MV, pulsetimes in the microsecond regime and output impedances in the few Ohm range. The use of capacitor-bank sources to drive the plasma-gun discharge permits repetitive operation of the PVG at rates of several kHz. The PVG includes 1) a coaxial plasma-gun that serves as a source high speed, electrically-conducting plasma; 2) a source of axial magnetic field; and 3) a multi-turn coil or set of multi-turn coils that will experience an induced voltage when plasma flow displaces magnetic flux from the region interior to the coil(s). The magnetic flux source and the multi-turn coil(s) are placed near the end of the coaxial gun to receive the high speed plasma flow. The coaxial plasma-gun provides an axisymmetric discharge between coaxial electrodes. Interaction of the discharge current with its azimuthal magnetic field accelerates plasma axially downstream (after an initiation phase that may involve an inverse-pinch discharge). Axial plasma flow at speeds of 50–100 km/s is sufficient to displace magnetic flux at the end of the gun. Such displacement past the multi-turn coil induces high voltages between the ends of the coil(s). These voltages can then be used to drive a high impedance load, such as an electron-beam diode.

11 Claims, 1 Drawing Sheet

PLASMA-GUN VOLTAGE GENERATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to voltage generators, and more specifically the invention pertains to a plasma gun for use as a supply of high voltages.

Conventional techniques for generating fast-rising, high-voltage pulses generally involve high-voltage capacitors and a plurality of high-voltage, closing-switches in arrangements such as Marx generators. High voltages are also generated from lower voltage pulses by means of transformers. In this case, the output pulse generally follows the rise-time and duration of the input pulse.

The task of generating high voltage pulses is alleviated to some extent, by the systems described in the following U.S. Patents, the disclosures of which are incorporated herein by reference:

U.S. Pat. No. 4,360,763 issued to Gryzinski;

U.S. Pat. No. 4,019,006 issued to Strossner;

U.S. Pat. No. 3,714,510 issued to Hofman; and

U.S. Pat. No. 3,435,287 issued to Jacobsen

Magnetic flux compression generators, usually known as explosive-generators or MCGs (for magnetocumulative generators), can be used to generate moderately high voltages, (typically, tens of kilovolts), at very high currents (tens of megamperes), but the pulsetimes for the voltage rise are relatively long (>tens of microseconds). Transformer techniques and various current-interrupter schemes have been used to obtain desired higher voltages and shorter pulses, but such techniques generally increase the size, weight and complexity of the system. Furthermore, explosively-driven, metal armatures in MCGs typically require much more energy (per shot) than needed by the load simply to operate at sufficently high magnetic Reynolds number. This results in local destruction of the generator system and precludes repetitive pulsing.

SUMMARY OF THE INVENTION

The present invention is a plasma gun voltage generator (PVG) that uses a pulsed plasma-flow to displace magnetic flux, thereby inducing high voltages across multi-turn coils. Typical operating parameters are voltages of 0.5 to 1 MV, pulsetimes in the microsecond regime and output impedances in the few Ohm range. The use of capacitor-bank sources to drive the plasma-gun discharge would permit repetitive operation of the PVG at rates of several kHz, which is important for some military needs. The ability to use compact energy sources, such as explosive generators and (relatively) low-voltage, high energy-density capacitors, permits employment of the PVG in mobile applications.

One embodiment of the invention uses: 1) a coaxial plasma-gun that serves as a source high speed, electrically-conducting plasma; 2) a source of axial magnetic field; and 3 a multi-turn coil or set of multi-turn coils that will experience an induced voltage when plasma flow displaces magnetic flux from the region interior to the coil(s). The magnetic flux source and the multi-turn coil(s) are placed near the end of the coaxial gun to receive the high speed plasma flow. The coaxial plasma-gun provides an axisymmetric discharge between coaxial electrodes. Interaction of the discharge current with its azimuthal magnetic field accelerates plasma axially downstream (after an initiation phase that may involve an inverse-pinch discharge). Axial plasma flow at speeds of 50–100 km/s is sufficient to displace magnetic flux near the end of the gun. Such displacement past the multi-turn coil (or alternatively, the increase in magnetic field in a plurality of multi-turn coils, at separate azimuthal stations, due to magnetic flux compression) induces high voltages between the ends of the coil(s). These voltages can then be used to drive a high impedance load, such as an electron-beam diode.

The present invention can be described as a three step process that entails: providing a magnetic flux; generating a high speed plasma flow to displace that magnetic flux; and inducing a voltage output into a multi-turn coil that is subjected to the displaced magnetic flux.

It is an object of the invention to provide a plasma gun voltage generator design. It is another object of the invention to use pulsed plasma flow to displace magnetic flux across or set of coils to induce high voltages thereby.

These objects together with other objects, features and advantages of the invention will become more readily apparent from the following detailed description when take in conjunction with the accompanying drawings wherein like elements are given like reference numerals throughout.

DESCRIPTION OF THE DRAWINGS

The sole FIGURE of the drawings is FIG. 1 which illustrates the plasma gun voltage generator of the present invention.

DETAILED DESCRIPTION OF THE PREFERRED EMBODIMENT

Figure 1:
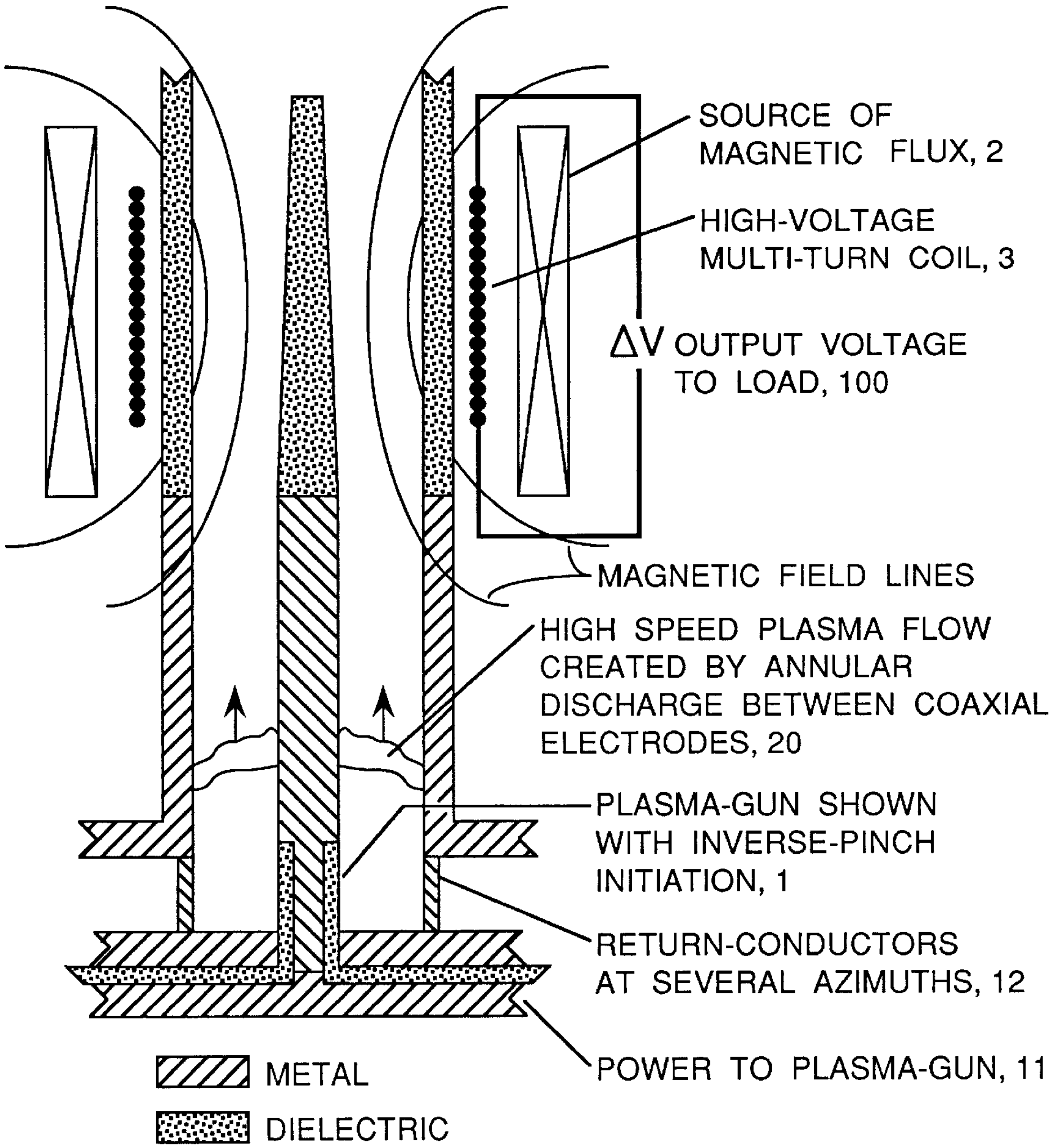

The present invention is the Plasma-Gun Voltage-Generator (PVG) as depicted in FIG. 1. The PVG basically comprises 1) a coaxial plasma-gun that serves as a source high speed, electrically-conducting plasma; 2) a source of axial magnetic field; and 3) a multi-turn coil or set of multi-turn coils that will experience an induced voltage when plasma flow displaces magnetic flux from the region interior to the coil(s). The magnetic flux source 2 and the multi-turn coil(s) 3 are placed near the end of the coaxial gun 1 to receive the high speed plasma flow 20. The coaxial plasma-gun 1 provides an axisymmetric discharge between coaxial electrodes 12. Interaction of the discharge current with its azimuthal magnetic field accelerates plasma axially downstream (after an initiation phase that may involve an inverse-pinch discharge). Axial plasma speeds of 50–100 km/s are sufficient to induce azimuthal current in the outer surface of the plasma flow as it enters a region of solenoidal magnetic field at the end of the gun. This current results in displacement of magnetic flux. Such displacement past the multi-turn coil (or alternatively, the increase in magnetic field in a plurality of multi-turn coils, at separate azimuthal stations, due to magnetic flux compression) induces high voltages between the ends of the coil(s). These voltages can then be used to drive a high impedance load, such as an electron-beam diode.

The formulation of the design of the PVG starts with the basic equation for the voltage induced in the multi-turn coil:

$$\Delta V = N\, d\phi/dt$$

where N is the number of turns in the coil and $\phi$ is the magnetic flux through the cross-sectional area (normal to the magnetic field) of a single turn of the coil. The magnetic flux is the product of the magnetic induction B and this coil area, and is computed differently for the case of a plurality of multi-turn coils at separate azimuthal locations vs the case of a single coil that surrounds the axis of symmetry of the PVG. In the former case, if $A_{coil}$ is the cross-sectional area of the coil (normal to the magnetic field lines), and B is the magnetic field through this cross-sectional area.

$$d\phi/dt=A_{coil}\ dB/dt$$

The rate of change of magnetic field is $$dB/dt-B_o r+^2 u_p(t)/\Delta z(r_t^2-r_p^2)$$

where $B_o$ is the initial magnetic field provided by the separate source of magnetic flux, $r_t$ is the radius of the flux source (which is assumed here to conserve the enclosed flux on the timescale of plasma motion through the coil), $r_p$ (t) is the radius of the plasma flow, $u_p$ is the is the axial speed of the plasma, and $\Delta z$ is the effective length of the output coils. The net output voltage of the several separate coils will depend on the series/parallel connections of these coils.

For the case of the multi-turn coil surrounding the axis of symmetry (and the plasma flow), the rate of change of magnetic flux within the coil is $$d\phi/dt-\Delta\phi/\Delta t=-\pi B_o r_p^2(r_t^2-r_c^2)u_p/\Delta z(r_t^2-r_p^2)$$

where $r_c$ is the radius of the coil. Note that the voltage is negative because the flux surrounded by the coil is decreasing with time. The polarity of the output pulse can be changed simply by reversing the direction of the initial magnetic field.

In both cases, the output power (vs voltage) of the PVG depends on the current through the coil(s). This current is determined by the load impedance, but is limited by the mechanical strength of the coil because of the force of interaction between the coil current and the axial magnetic field. (There are also forces due the interaction of currents with the fields produced by the coil and with radial components of the sources field.) These forces may be readily evaluated using standard techniques based on derivatives of the mutual inductances between coils (including the axially-displaced, plasma cylinder as a single-turn coil), coupled to appropriate circuit equations for the source, load and plasma. Numerical calculations with MHD codes, such as MACH2, are useful for examining PVG operation in detail.

Typical design parameters for the Plasma-Gun Voltage-Generator are:

Output voltage—0.2 to 1.0 MV, Output impedance—1 to 10 ohms

Axial plasma speeds—50 to 100 km/sec, Peak magnetic field 20 T

The PVG can use the technology of other coaxial plasma guns. Manufacturing the PVG can therefore follow standard procedures for high-voltage insulation and vacuum sealing found in such devices. The coaxial source coil for the magnetic flux and the multi-turn coil(s) can also be designed and manufactured in accord with standard practices for laboratory plasma apparatus.

The advantage of the Plasma-Gun Voltage-Generator over conventional techniques for generating high-voltage pulses, such as Marx generators, is based on elimination of the size, weight and complexity that conventional techniques require for energy storage and switching. Saving in regard to energy storage is obtained by using compact, low-impedance sources, such as MCGs or relatively low-voltage capacitors, to drive the coaxial plasma-gun discharge. Multiple switches needed for several stages of Marx generator are replaced with multiple turns of wire in the high-voltage output coil of the PVG.

The PVG may have some advantages over the Magnetic Voltage-Pulser (MVP) in design situations for which the open exhaust of plasma flow through the bore of output coil of the PVG permits longer lifetime and repetitive operation. Like the MVP, the PVG has advantages over conventional MCGs because plasma conductors can achieve the necessary values of magnetic Reynolds number for magnetic flux compression without requiring the high energy densities of explosively-driven, solid-metal conductors that result in local destruction of the generator. (This advantage depends on the application and does not matter if local destruction is part of the overall system design).

Variations on Plasma-Gun Voltage-Generator operation include the use of other techniques to obtain the pulsed, axial flow of high-speed, high conductivity plasma (instead of a coaxial plasma gun). These techniques may comprise explosively-shocked gas (usually seeded with materials to enhance electrical conductivity) and similar flows created by explosively-driven cylinders or plates.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A voltage generator comprising:

a means for providing magnetic flux, having lines of magnetic field oriented along an axis;

a means for generating a high speed plasma flow along said axis towards said magnetic flux to create a displaced magnetic flux wherein said generating means comprises:

a housing containing a supply of gas; a plasma gun with coaxial electrode elements that generate an annular, axisymmetric discharge to ionize said gas in said housing and to generate the high speed plasma flow; and a means for supplying power to said plasma gun, wherein said supplying means is a power supply unit that outputs between 10 and 50 kV of electricity level to said plasma gun, said electricity level being selected to cause said plasma flow to have a velocity of between 50 and 100 km/second; and a multi-turn coil which is enveloped in said displaced magnetic flux to undergo induction that causes said multi-turn coil to output a voltage signal.

2. A voltage generator, as defined in claim 1, wherein said multi-turn coil has N preselected number of turns in the coil where N is an integer determined by:

$\Delta V=N\ d\ \phi/dt$ where $\Delta V$ equals a voltage level of the voltage signal output by the multi-turn coil, and $\phi$ equals a level of magnetic flux produced by said providing means.

3. A voltage generator, as defined in claim 1, wherein said providing means comprises a magnetic flux source that can output magnetic flux at preselected levels that can range between 0.0 and 20 T.

4. A voltage generator comprising:

a means for providing magnetic flux, having lines of a magnetic field oriented along an axis;

a means for generating a high speed plasma flow along said axis towards said magnetic flux to create a displaced magnetic flux; and a multi-turn coil which is enveloped in said displaced magnetic flux to undergo induction that causes said multi-turn coil to output a voltage signal, wherein said multi-turn coil has N preselected number of turns in the coil where N is an integer determined by:

$\Delta V = N\, d\phi/dt$ where $\Delta V$ equals a voltage level of the voltage signal output by the multi-turn coil, and $\phi$ equals a level of magnetic flux produced by said providing means.

5. A voltage generator, as defined in claim 4, wherein said providing means comprises a magnetic flux source that can output magnetic flux at preselected levels that can range between 0.0 and 20 T.

6. A voltage generator comprising:

a means for providing magnetic flux, having lines of magnetic field oriented along an axis;

a means for generating a high speed plasma flow along said axis towards said magnetic flux to create a displaced magnetic flux wherein said generating means comprises:

a housing containing a supply of gas; a plasma gun with coaxial electrode elements that generate an annular, axisymmetric discharge to ionize said gas in said housing and to generate the high speed plasma flow, and a means for supplying power to said plasma gun; and a multi-turn coil which is enveloped in said displaced magnetic flux to undergo induction that causes said multi-turn coil to output a voltage signal wherein said multi-turn coil has N preselected number of turns in the coil where N is an integer determined by:

$\Delta V = N\, d\phi/dt$ where $\Delta V$ equals a voltage level of the voltage signal output by the multi-turn coil, and $\phi$ equals a level of magnetic flux produced by said providing means.

7. A voltage generator, as defined in claim 6, wherein said, providing means comprises a magnetic flux source that can output magnetic flux at preselected levels that can range between 0.0 and 20 T.

8. A voltage generator comprising:

a means for providing magnetic flux, having lines of magnetic field oriented along an axis; wherein said providing means comprises a magnetic flux source that can output magnetic flux at preselected levels that can range between 0.0 and 20 T;

a means for generating a high speed plasma flow along said axis towards said magnetic flux to create a displaced magnetic flux wherein said generating means comprises:

a housing containing a supply of gas; a plasma gun with coaxial electrode elements that generate an annular, axisymmetric discharge to ionize said gas in said housing and to generate the high speed plasma flow; and a means for supplying power to said plasma gun; and a multi-turn coil which is enveloped in said displaced magnetic flux to undergo induction that causes said multi-turn coil to output a voltage signal.

9. A process for generating an output voltage signal comprising the steps of:

providing a magnetic flux that has lines of magnetic field along an axis;

generating a high speed plasma flow along the axis through said magnetic flux to produce thereby a displaced magnetic flux, wherein said generating step is accomplished by using a plasma gun with coaxial electrode elements to generate an annular, axisymmetric discharge to ionize a gas, said plasma gun using between 10 and 50 kV of electricity to give said plasma flow a high speed ranging between 50 and 100 km/second; and inducing said output voltage signal in a multi-turn coil by subjecting said multi-turn coil to said displaced magnetic flux.

10. A process, as defined in claim 9, wherein said inducing step is accomplished by selecting said multi-turn coil that has N preselected number of turns in the coil where N is an integer determined by:

$\Delta V = N\, d\,\phi/dt$ where $\Delta V$ equals a voltage level of the voltage signal output by the multi-turn coil, and $\phi$ equals a level of magnetic flux produced by said providing step.

11. A process for generating an output voltage signal comprising the steps of:

providing a magnetic flux that has lines of magnetic field along an axis;

generating a high speed plasma flow along the axis through said magnetic flux to produce thereby a displaced magnetic flux; and inducing said output voltage signal in a multi-turn coil by subjecting said multi-turn coil to said displaced magnetic flux, wherein said inducing step is accomplished by selecting said multi-turn coil that has N preselected number of turns in the coil where N is an integer determined by:

$\Delta V = N\, d\phi/dt$ where $\Delta V$ equals a voltage level of the voltage signal output by the multi-turn coil, and $\phi$ equals a level of magnetic flux produced by said providing step.

* * * * *